Sept. 17, 1957
P. C. WELCH
2,806,438
DOUGH DOCKING MECHANISM
Filed June 6, 1955
2 Sheets-Sheet 1
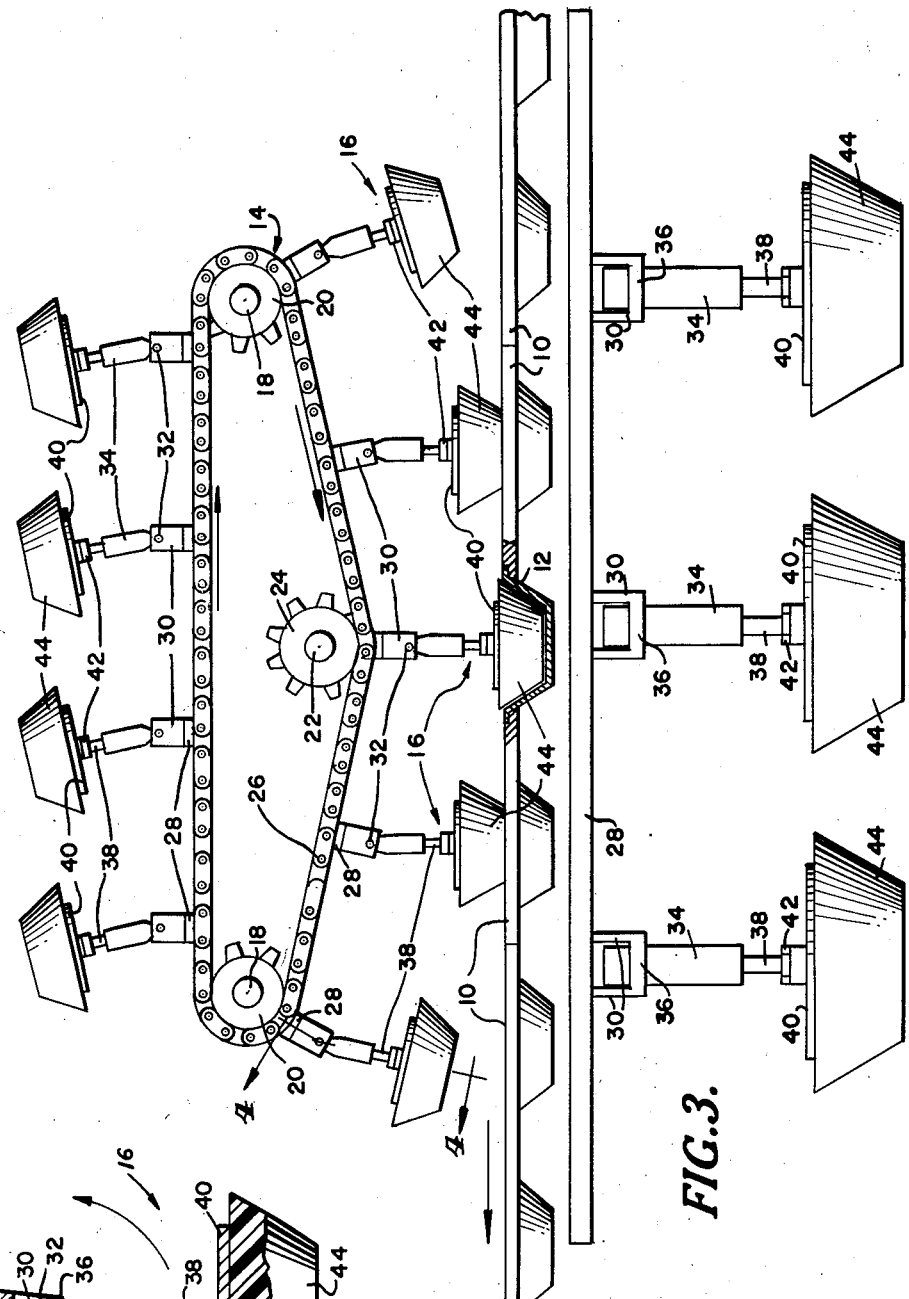
INVENTOR
PARKER C. WELCH
BY 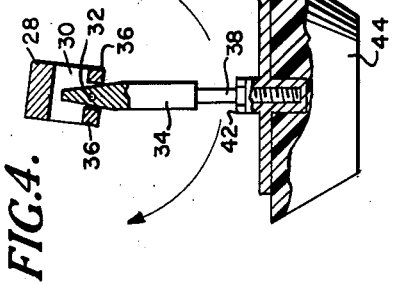
ATTORNEYS

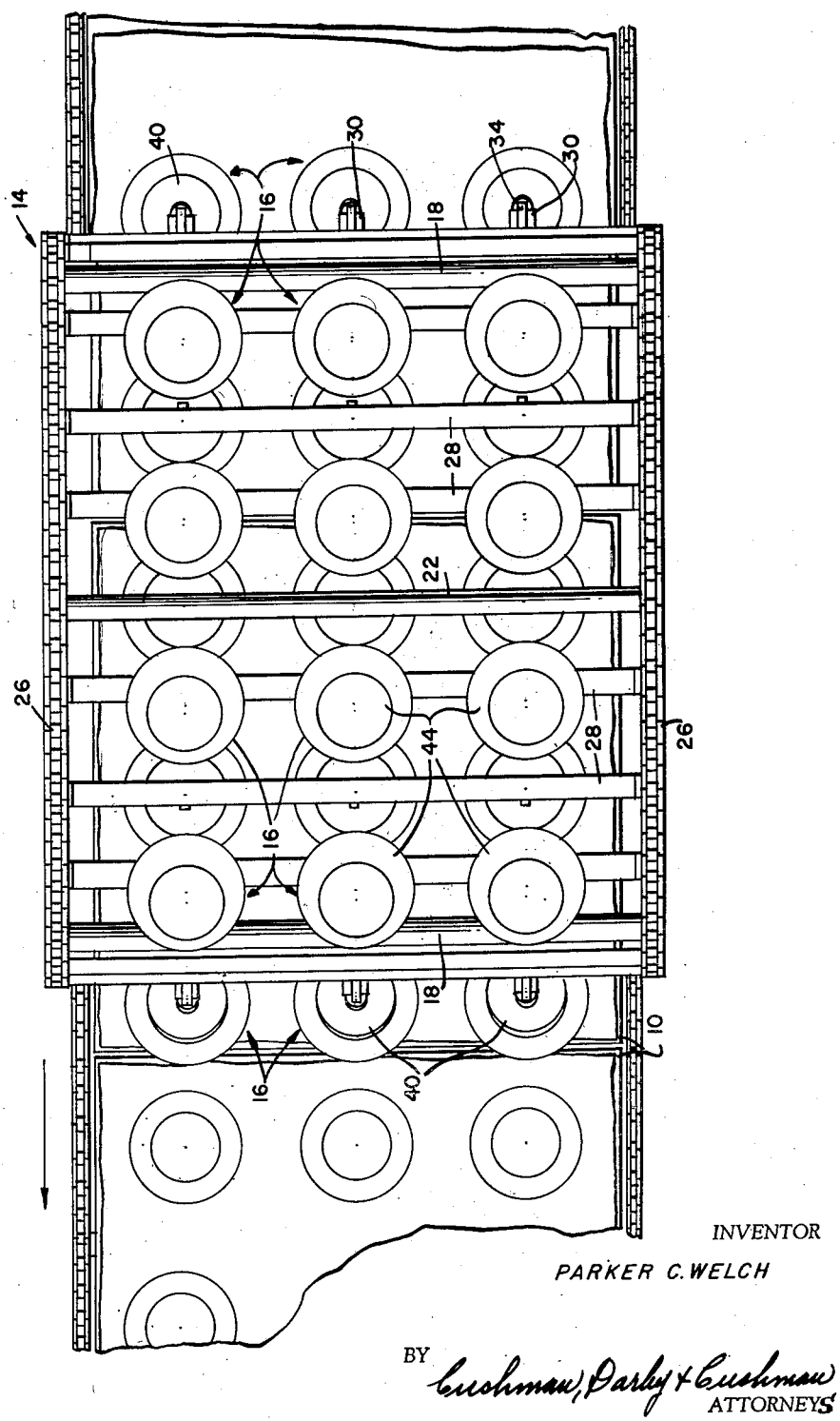

United States Patent Office 2,806,438
Patented Sept. 17, 1957

2,806,438

DOUGH DOCKING MECHANISM

Parker C. Welch, Louisville, Ky., assignor to Morton Packing Company, Louisville, Ky., a corporation of Kentucky Application June 6, 1955, Serial No. 513,287

6 Claims. (Cl. 107—15)

This invention relates to improvements in pastry making machines and more particularly to a novel mechanism for docking dough in pie plates to form the lower crust of a pie.

In making pies in large quantities by the use of pie-making machinery such as disclosed in my copending application Serial No. 508,155, filed May 13 1955, the step of docking the dough initially within the empty pie plates constitutes an important step in the entire pie-making procedure. As set forth in the aforesaid application, the main conveyor of such a pie-making machine includes a series of pie plate holders continuously movable along a predetermined path. During their movement, such holders receive a continuous sheet or individual sheets of dough from a dough sheeting mechanism such as disclosed in my copending application Serial No. 513,286, filed June 6, 1955. These dough sheets are supported in a flat condition upon the holders so that they cover the pie plates held thereby. Where the dough sheets are to be utilized as a lower crust of the pie, as for example, in making fruit pies, the sheets must be pressed or docked within the pie plates so that they will conform to the entire internal surface of the pie plates.

The deformation of the dough sheets within the pie plates during the docking operation may result in a tearing or breaking of the dough sheet unless the operation is performed with a gentle action. Excessive breakage of the dough sheet has occurred in the docking mechanism heretofore utilized due to the pulling, dragging or adhesive action incident to the operation thereof. It will be understood that where the bottom crust of the pie is broken, such pie will be imperfect and must be removed from the line, thus lowering the productive output of the entire machine.

Accordingly, it is an object of the present invention to provide a docking mechanism which contacts the dough sheets with a gentle action so as to substantially prevent breakage and the attendant disadvantages thereof, as indicated above.

Another object of the present invention is the provision of a novel dough docking mechanism having improved dough-contacting surfaces, which surfaces substantially prevent sticking of the dough thereto.

A further object of the present invention is the provision of a dough docking mechanism which is simple in construction, easy to operate and economical to manufacture.

These and other objects of the present invention will become more apparent during the course of the following detailed description and appended claims.

The invention may best be understood with reference to the drawings wherein an illustrative embodiment is shown.

In the drawings:

Figure 1 is a side elevational view of a dough docking mechanism embodying the principles of the present invention, showing the same in operative position with respect to the pie plate holders of a pie-making machine;

Figure 2 is a top plan view of the structure shown in Figure 1;

Figure 3 is a detailed side elevational view showing one flight of the dough docking mechanism; and Figure 4 is a cross-sectional view taken along the line 4—4 of Figure 3.

The docking mechanism of the present invention is particularly adapted to be used in a pie-making machine such as disclosed in my copending application Serial No. 508,155, where pies having a lower crust are to be made. As set forth in this application, the main conveyor means of the machine includes a series of flat pie plate holders mounted for continuous movement along an endless path, the upper substantially horizontal run of which constitutes the operative run of the machine. In Figures 1 and 2 of the drawings, a portion of such a main conveyor is illustrated and it will be seen that each rectangular pie plate holder 10 includes a series of nine openings 12 within which the pie plates are supported.

As the holders 10 are moved along their upper, operative run, a continuous dough sheet or individual sheets are deposited on the holders so as to cover the pie plates held thereby. However, it will be appreciated that such sheet or sheets of dough are deposited in a flat condition on the holders so that in order to utilize this dough as the lower crust of the pies to be made, the same must be pressed into conformity with the interior of the pie plates. Such an operation is known in the art as "docking."

With the above in mind, it will be appreciated that the dough docking mechanism of the present invention is adapted to be incorporated in a pie-making machine so as to perform its operation after the dough sheet has been deposited over the pie plates.

Referring now more particularly to the drawings, the dough docking mechanism of the present invention comprises a conveying means, generally indicated at 14, for continuously moving a series of dockers, generally indicated at 16, along an endless path, the lower run of which constitutes the operative run thereof.

The conveying means 14 includes suitable frame means (not shown) which may be secured to the frame of the main conveyor so as to dispose the docking mechanism above the upper operative run thereof at a position forwardly of the dough sheet depositing mechanism. Suitably journaled between the frame of the conveying means is a pair of horizontally spaced shafts 18 having sprocket wheels 20 mounted on opposite ends thereof. A third shaft 22 is suitably journaled between the shafts 18 below the same and has sprocket wheels 24 mounted on its opposite ends in alignment with respective sprocket wheels 20. A pair of transversely spaced chains 26 are trained about the aligned groups of sprocket wheels 20 and 24.

Extending between the chains 26 is a series of spaced transverse flight bars 28 having their ends suitably secured to corresponding selective links of the chains. The flight bars 28 are spaced apart a distance substantially equal to the longitudinal distance between adjacent openings 12 in the holders 10. Spaced along the flight bars a distance substantially equal to the transverse distance between adjacent openings 12 are pairs of laterally extending lugs 30, each pair of which may be transversely apertured to receive a pivot pin 32. Thus, the pairs of lugs 30 are disposed so that the series of dockers 16, which are carried thereby, will be centered within the pie plates supported in the openings 12 of the holders during the cooperative movement of the conveying means 14 and the main conveyor.

Each of the dockers 16 comprises a standard or mounting member 34 having its upper end pivotally mounted on the pin 32 between the associated pair of lugs 30, Rigid stop bars 36 extend transversely between each pair of lugs 30 on opposite sides of the associated standard 34 and are operable to limit the pivotal movement of the standards during their movement with the conveying means 14. The lower end of each standard 34 is provided with a rigid depending bolt 38, the lower end of which is threaded within a central boss in a circular plate 40, of metal or the like. A locking nut 42 is preferably threaded on each bolt above the central boss so that the same may be tightened into engagement therewith to maintain the plates in any selected position of adjustment on the bolt.

Secured to the lower surface of each plate 40, as by a suitable adhesive or the like, is an annular docker head 44 which is in the shape of an inverted truncated cone of a size and wall inclination sufficient to register within a pie plate with just sufficient clearance for the dough sheet. This docker head may be made of sponge rubber, Teflon (polytetrafluoroethylene) or other suitable material. Preferably, at least the dough-contacting surface thereof is formed of Teflon since it has been found that this material has excellent non-sticking properties with respect to the dough.

It is to be understood that suitable means (not shown) may be provided for driving the conveying means 14 in timed relation with respect to the movement of the main conveyor so that in operation, the dockers 16 will be successively moved into proximity to the pie plates moving continuously therebelow. It will be seen that the lower operative run of the conveying means 14 is first inclined downwardly and then upwardly. In this manner, as the dockers secured to each flight move around the rear sprocket wheels 20, the weight of the docker heads 44 will cause the dockers to drop into a limiting position wherein the stop bars act to restrain the dockers from further pivotal movement. Preferably, the upper ends of the standards are shaped and positioned with respect to the stop bars so that the forward surface of the standard is in engagement with the forward stop bar during the succeeding downwardly inclined portion of the lower operative run. However, as can best be seen in Figure 1, the dockers are disposed substantially vertically during this portion of the run, so that the stop engagement acts mainly to stabilize their movement so as to prevent swinging or pivoting thereof. Stated differently, during the downwardly inclined portion of the lower operative run, the dockers are substantially free to seek their gravitational equilibrium but are prevented by the stop bars from movement in one direction away from such position. Since the standards are in engagement with the stops prior to the commencement of this portion of the run, the dockers will have substantially no swinging, pivoting or pendulum movement.

The conveying means 14 is timed with respect to the main conveyor so that the horizontal component of the linear speed of the lower run is equal to the linear speed of the upper run of the main conveyor. Thus, the movement of the dockers with respect to the pie plates during the downwardly inclined portion of the operative run is substantially vertical translation. In this manner, the docker heads are moved from a position directly above the pie plates, downwardly into the same so as to press or dock the dough within the pie plates with a gentle action. Of course, this movement of the dockers is with respect to the pie plates and it must be remembered that both the pie plates and dockers are continuously moving horizontally as the docking operation takes place.

When the dockers reach the bottom of the downwardly inclined portion of the operative run, they will be substantially within the pie plates so that as they move around the sprocket wheels 24, no swinging movement of the dockers will take place. In other words, while the stop bars will move out of engagement with the standards as the dockers move around the sprocket wheels 24, the deep engagement of the docker heads within the pie plates substantially prevents any pivotal movement of the dockers. Moreover, since the dockers are vertical during the downwardly inclined portion of the run, their position with respect to the vertical will not change.

At the lowermost point or midpoint of the operative run, the docker heads will be disposed completely within the pie plates so as to finish the gentle action docking of the dough. As the dockers continue up the upwardly inclined portion of the operative run, the rearward surface of the upper ends of the standards will engage the rearward stop bars so that pivotal movement past a vertical position in the opposite direction is prevented. Thus, as the dockers are moved upwardly with respect to the pie plates, the stop bars act to positively prevent pivotal movement in one direction which for practical purposes substantially eliminates all pivoting during this portion of the run. As the dockers reach the forward sprocket wheels, the docker heads will be clear of the associated pie plates and are free to travel around the sprockets and along the upper inoperative run. As they move toward and then around the rearward sprocket wheels, they will drop into their opposite limiting position and the cycle is repeated.

It can thus be seen that there has been provided a docking mechanism which operates with a gentle action upon the dough to press the same into conformity with the interior of a pie plate. By moving the dockers solely in a vertical direction with respect to the pie plate, the possibility of tearing or breaking the dough is reduced to a minimum. This feature constitutes a distinct advantage over the locking mechanism heretofore used wherein the docker head moves angularly with respect to the pie plate so as to cause a dragging or pulling action thereon. This latter action quite often results in the breaking of the dough sheet with the attendant disadvantages thereof. Moreover, by providing Teflon as the dough engaging surface of the dockers, sticking is reduced to a minimum and the problems incident to the adhesive action of the docking mechanisms heretofore known are substantially eliminated.

It is to be understood that the form of the invention herewith shown and described is to be taken as the preferred embodiment of the same and that various changes may be made without departing from the spirit of the invention or the scope of the appended claims.

I claim:

1. A dough docking mechanism comprising sprocket wheel means rotatable about horizontally spaced parallel axes, endless chain means trained about said sprocket wheel means in a position to provide a downwardly extending inclined portion and an upwardly extending portion of the same inclination, a series of dough dockers each providing an exterior surface conforming in shape to the interior configuration of a pie plate, means pivotally mounting said dough dockers on said endless chain means in predetermined spaced relation so that the dockers are supported in pendulum fashion during their movement with said chain means along the inclined portions thereof, and stop means preventing said dockers from moving past a vertical position in one direction during their movement with said chain means through the inclined portions thereof.

2. A dough docking mechanism as defined in claim 1 wherein each of said dockers comprises a docker head providing said external surface and a standard vertically adjustably connected to said docker head.

3. A dough docking mechanism as defined in claim 2 wherein said endless chain means comprises a pair of horizontally spaced parallel endless chains, and wherein said dough docker mounting means comprises transversely extending flight bars connected between said endless chains and pairs of spaced lugs extending laterally from said flight bars for carrying said dockers.

4. A dough docking mechanism as defined in claim 3 wherein each of said dockers includes a standard having its upper end pivotally mounted between a pair of spaced lugs.

5. A dough docking mechanism as defiend in claim 4 wherein said stop means comprises spaced bars extending between each pair of lugs so as to engage the associated standard.

6. In a pie making machine, means for continuously moving a series of pie plates in predetermined spaced relation horizontally through a dough docking station with the interior of the plates facing upwardly, a dough docking mechanism disposed at said station for pressing portions of dough in sheet form deposited over the pie plates into conformity with the interior of the pie plates during their movement through the station, said dough docking mechanism comprising sprocket wheel means rotatable about horizontally spaced parallel axes, endless chain means trained about said sprocket wheel means in a position to provide a downwardly extending inclined portion and an upwardly extending portion of the same inclination, a series of dough dockers each providing an exterior surface conforming in shape to the interior configuration of a pie plate, means pivotally mounting said dough dockers on said endless chain means in predetermined spaced relation so that the dockers are supported in pendulum fashion during their movement with said chain means along the inclined portions thereof, and stop means preventing said dockers from moving past a vertical position in one direction during their movement with said chain means through the inclined portions thereof.

References Cited in the file of this patent

UNITED STATES PATENTS

| | | |
|---|---|---|
| 782,615 | Manning | Feb. 14, 1905 |
| 2,023,291 | Roth | Dec. 3, 1935 |
| 2,030,598 | Liles | Feb. 11, 1936 |
| 2,494,236 | Goldstein | Jan. 10, 1950 |
| 2,679,215 | Truesdell | May 25, 1954 |
| 2,699,737 | Sticelber | Jan. 18, 1955 |
| 2,700,939 | Liston | Feb. 1, 1955 |